(12) United States Patent
Keller et al.

(10) Patent No.: US 11,021,887 B2
(45) Date of Patent: Jun. 1, 2021

(54) METHOD OF CONSTRUCTING A TOWER

(71) Applicants: Siemens Gamesa Renewable Energy A/S, Brande (DK); KUKA ROBOTER GMBH, Augsburg (DE)

(72) Inventors: Henrik Keller, Augsburg (DE); Rainer Kuth, Höchstadt (DE); Philip Mewes, Nuremberg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 445 days.

(21) Appl. No.: 15/182,656

(22) Filed: Jun. 15, 2016

(65) Prior Publication Data
US 2017/0016244 A1    Jan. 19, 2017

(30) Foreign Application Priority Data

Jul. 13, 2015 (EP) .................................. 15176546

(51) Int. Cl.
*E04H 12/34* (2006.01)
*E04H 12/12* (2006.01)
(Continued)

(52) U.S. Cl.
CPC ............ *E04H 12/341* (2013.01); *B28B 1/001* (2013.01); *B33Y 10/00* (2014.12); *E04G 21/04* (2013.01);
(Continued)

(58) Field of Classification Search
CPC ....... E04H 12/12; E04H 12/34; E04H 12/341; E04H 7/18; E04H 7/26; B33Y 10/00;
(Continued)

(56) References Cited

U.S. PATENT DOCUMENTS 3,497,579 A    2/1970  Barron
4,193,750 A *  3/1980  Nielson .................. E04G 11/20
                                                       425/261
(Continued)

FOREIGN PATENT DOCUMENTS

CN    103331817 A    10/2013
CN    103619552 A    3/2014
(Continued)

OTHER PUBLICATIONS

"Minibuilders" by IAAC, Vimeo Video, https://vimeo.com/97976677, screenshots also provided. (Year: 2014).*
(Continued)

*Primary Examiner* — Robert C Dye
*Assistant Examiner* — Sedef E Paquette
(74) *Attorney, Agent, or Firm* — Schmeiser, Olsen & Watts LLP

(57) ABSTRACT

A method of constructing a tower is provided, the method including the steps of providing an elevation mechanism including a dynamic engaging mechanism realized to engage with a tower surface, arranging a 3D printing device on the elevation means, actuating the dynamic engaging mechanism to effect a vertical elevation of the elevation mechanism, actuating the 3D printing device to deposit an essentially horizontal material layer including at least a tower body region, and repeating the steps to obtain a tower structure. A tower constructed using such a method, and a 3D tower printing apparatus, is also provided.

16 Claims, 5 Drawing Sheets

(51) Int. Cl.
*E04G 21/04* (2006.01)
*B33Y 10/00* (2015.01)
*B28B 1/00* (2006.01)
*B33Y 80/00* (2015.01)

(52) U.S. Cl.
CPC ..... *E04G 21/0436* (2013.01); *E04G 21/0463* (2013.01); *E04H 12/12* (2013.01); *B33Y 80/00* (2014.12); *E04G 21/0427* (2013.01); *Y02E 10/728* (2013.01)

(58) Field of Classification Search
CPC ......... B33Y 80/00; B28B 1/001; E04G 21/04; E04G 21/0427; E04G 21/0436; E04G 21/0463; E04G 13/021; E04G 11/28; E04G 11/20; E04G 11/22; E04G 11/24; B29C 64/10; B29C 64/124; B29C 64/153; B29C 70/00; E04B 1/00
USPC ................................ 264/32, 31, 34; 405/211
See application file for complete search history.

(56) References Cited

U.S. PATENT DOCUMENTS

| | | | |
|---|---|---|---|
| 9,375,861 B2 | 6/2016 | Schibsbye | |
| 2013/0087674 A1* | 4/2013 | Couasnon | B60N 2/0232 248/429 |
| 2014/0208665 A1 | 7/2014 | Kapitza et al. | |
| 2014/0348662 A1* | 11/2014 | Schibsbye | E04H 12/341 416/244 A |
| 2015/0076732 A1* | 3/2015 | Kemmer | B29C 64/106 264/255 |
| 2015/0300036 A1* | 10/2015 | Khoshnevis | E04G 21/0463 425/63 |

FOREIGN PATENT DOCUMENTS

| | | | | |
|---|---|---|---|---|
| CN | 204052899 U | 12/2014 | | |
| CN | 204059974 U | 12/2014 | | |
| CN | 104405172 A | 3/2015 | | |
| CN | 104763151 A | 7/2015 | | |
| EP | 2735674 A1 * | 5/2014 | | F03D 13/10 |
| KR | 99015842 A | 3/1999 | | |
| WO | 2013120889 A1 | 8/2013 | | |

OTHER PUBLICATIONS

European Extended Search Report, Application No. 15176546.8, 9 pgs.
Non-English Chinese Office Action dated Dec. 13, 2019 for Application No. 201610548043.2.
European Extended Search Report for Application No. 15176546.8; 9 pages.

* cited by examiner

METHOD OF CONSTRUCTING A TOWER

CROSS-REFERENCE TO RELATED APPLICATION

This application claims priority to European Application No. 15176546.8 having a filing date of Jul. 13, 2015 the entire contents of which are hereby incorporated by reference.

FIELD OF TECHNOLOGY

The following describes a method of constructing a tower; a tower; and a 3D tower printing apparatus.

BACKGROUND

Tower structures are required for various purposes, for example to support a wind turbine nacelle, for television masts, bridge supports, high-voltage pylons, etc. A tall tower such as a wind turbine tower can be made of steel sections that are connected on site to assemble the tower. However, steel is expensive, and the tower sections must be manufactured with a high degree of accuracy in order to be able to assemble the tower. Another problem with steel tower structures is the difficulty in transporting a tower segment to the site without any deformation or ovalization of the tower segment. Therefore, such tower structures are being built using concrete, since concrete is relatively economical.

Various approaches are known. For example, annular tower sections can be pre-cast and transported to the site, where the tower is assembled by stacking the tower segments one on top of the other. A problem with this approach is the transport of the heavy tower sections. The size of each tower section, which may be made of concrete or steel, is often a compromise. Large tower sections allow rapid construction of very high towers, but require special trucks and wide streets to transport the wide and heavy sections to the assembly site. On the other hand, small tower sections can be transported using standard trucks on normal roads, and can be lifted and stacked using standard cranes. However, the assembly process takes longer and is therefore more expensive, and the height of a tower made of small sections is limited. Another problem is that a suitably large crane is required to hoist the tower sections into place. Particularly in the case of an offshore wind turbine, this construction approach can be very time-consuming and expensive. Lifting the heavy tower sections into place for assembly is also a very hazardous procedure. Since a crane is required to stack multiple tower sections, the height of a tower is limited by the available crane types. The construction of a suitably large foundation may also be necessary to support such a large and heavy crane. Since wind speed generally increases with increasing height above ground or sea level, the height of a wind turbine tower is directly related to the power output of the wind turbine. Therefore, at least in the field of wind energy, it is desirable to construct very high towers. This is not always possible with construction techniques that require large cranes, particularly in the case of an offshore construction site, since the strong winds common at offshore locations can limit the maximum crane height. Therefore, particularly in the case of offshore wind farm sites, the problems mentioned above result in a limitation of the maximum tower height that can be achieved with the known techniques, which therefore limit the amount of energy that can be harvested from the wind.

In another approach, a concrete tower can be cast on-site by pouring concrete into an annular mould, allowing it to harden, moving the mould upwards, and repeating the process until the tower has reached the desired height. A problem with this approach is that it is relatively time-consuming and therefore costly, since each cast section must harden to a certain extent before the mould can be removed. The steps of moving the mould and adjusting its size (to allow for a decrease in diameter) are also time-consuming. Furthermore, the high degree of much manual intervention adds to the overall cost of the tower.

SUMMARY

An aspect relates to a way of constructing a very high tower while overcoming the limitations of the known tower construction techniques.

According to embodiments of the invention, the method of constructing a tower comprises the steps of:

A: providing an elevation means comprising a dynamic engaging mechanism realized to engage with a tower surface;
B: arranging a 3D printing device on the elevation means;
C: actuating the dynamic engaging mechanism to effect an essentially vertical elevation of the elevation means;
D: actuating the 3D printing device to deposit an essentially horizontal material layer comprising at least a tower body region; and
E: repeating steps C and D to obtain a tower structure.

In the context of embodiments of the invention, the 3D printing device applies layers of material, preferably concrete, in an additive manufacturing technique to "grow" a tower. As the tower "grows", the elevation means can engage with the previously printed tower surface in order to raise or lower the 3D printing device. In the context of embodiments of the invention, the material layer does not require lateral containment, i.e. the 3D printing device deposits an unbounded or uncontained layer of material. The consistency of the printed material is such that it is fluid enough to be printed, but viscous enough to retain its printed shape. Preferably, the 3D printing device is realized to comprise one or more robot arms and corresponding control means, for example an industrial robot arm arrangement. An advantage of the method according to embodiments of the invention, particularly when concrete is used as construction material, is that the tower can be constructed essentially without any interruption. In the method according to embodiments of the invention, the elevation means and the 3D printing device are essentially freely suspended relative to the tower, i.e. the elevation means is not attached or secured to the tower by means of scaffolding, cranes, frameworks, hooks, bolts, or any other permanent or semi-permanent attaching means. Unlike conventional in-situ concrete casting techniques, there is no need to construct a slip form to hold a fluid concrete mass; neither is it necessary to stall the construction process until a cast section has hardened. The additional mould that is required in the known techniques, and which must be repeatedly moved as the height of the cast tower increases, is not needed here. The method according to embodiments of the invention therefore very favourably reduces manufacturing costs since it facilitates a very straightforward an economical means of using a 3D concrete printing device to print a concrete tower.

In the method according to embodiments of the invention, successive layers of material, preferably concrete, are applied according to a specific pattern to result in the desired structure. It may be assumed that the 3D printing device comprises a feed head with a nozzle or dispenser for depositing a controlled amount of material at a controlled rate, and that the feed head can be moved in a controlled manner. For example, if an annular tower section is being constructed using concrete, the feed head can be controlled to describe an essentially circular path, depositing an essentially horizontal layer of concrete to give a desired layer depth, while forming the tower body region and any additional desired regions. In the context of embodiments of the invention, the term "essentially horizontal layer" does not exclude the possibility that the printed layer has an uneven and/or slightly inclined surface. Furthermore, layers can be deposited in an essentially seamless manner by applying successive layers in a spiral or helical manner. The "tower body region" is to be understood as the region that essentially defines the tower body shape.

According to embodiments of the invention, a tower is constructed using the method described above. An advantage of the tower according to embodiments of the invention is that it can be completed very quickly compared to known construction techniques. Furthermore, the inventive "tower printing process" can be performed continuously and is essentially independent of weather conditions or time of day. The tower according to embodiments of the invention can be constructed very quickly and can therefore be significantly cheaper than a tower constructed using a prior art technique, since adverse weather conditions such as high winds do not present a problem, unlike the known construction procedures which may need to be interrupted when high winds cause the operation of large cranes to be hazardous. Using the method according to embodiments of the invention, an entire tower can be printed from foundation level to an uppermost level. Alternatively, the tower can be assembled from a stack of tower sections previously printed using the method according to embodiments of the invention.

According to embodiments of the invention, the 3D tower printing apparatus comprises an elevation means comprising a dynamic engaging mechanism realized to engage with a tower surface; an elevation controller for actuating the dynamic engaging mechanism to effect a vertical displacement of the elevation means; a 3D printing device arranged on the elevation means; and a print controller for actuating the 3D printing device to deposit material in a series of essentially horizontal layers, each layer comprising at least a tower body region, to obtain a tower structure.

An advantage of the 3D tower printing apparatus according to embodiments of the invention is that it can be used to construct a tower section, or even a complete tower, in a rapid construction process. The apparatus according to embodiments of the invention is straightforward to use, and does not require additional cranes or frameworks to secure it while the tower section or tower is being constructed, neither does it require a mould to contain a fluid material until it hardens.

Particularly advantageous embodiments and features of the invention are given by the dependent claims, as revealed in the following description. Features of different claim categories may be combined as appropriate to give further embodiments not described herein.

The terms "3D printing" and "additive manufacturing" have the same meaning, and may be used interchangeably. The 3D printing device used in the context of embodiments of the invention can be realized to print or deposit a layer of any material that is suitable for constructing a tower. In the following, it may be assumed that the 3D printing device is realized to deposit or apply a controlled amount of fluid concrete at a controlled rate.

A fluid mass of concrete will harden after a certain time, depending on the concrete mixture composition, the layer thickness, the ambient temperature, humidity, etc. Preferably, the rate at which concrete is printed or deposited by the 3D concrete printing device is such that a previously deposited layer has hardened to an extent that still allows it to bind with a subsequently applied layer. The 3D concrete printing device can comprise one or more feed heads or nozzles for dispensing fluid concrete. For example, three equidistantly arranged printing heads may be used to simultaneously deposit concrete layers, so that three nested helices essentially form the tower section. Using several printing heads may be favourable in a lower tower region that has a relatively large diameter and that requires a correspondingly large quantity of concrete. In a higher tower region with smaller diameter, a single print head may suffice. Multiple feed heads may share a common supply line, or may each have separate supply lines. Preferably, the 3D concrete printing device is realized as an industrial robot, and a feed head can be mounted to an articulated robot arm with several degrees of freedom that can be actuated to move the feed head in a controlled manner. In a preferred embodiment of the invention, a print controller is used to control the industrial robot arm and its feed head(s) to print a predetermined sequence of layers to obtain a tower with a specific form. In the usual 3D printing approach, the shape of a layer may differ only slightly from the shape of a previously deposited layer.

An industrial concrete printing robot can have a swivel base mounted on a platform of the elevation means, and an articulated robot arm that can move radially. With such a realization, the printing robot can reach any point along the circumference of the tower. The platform is stationary relative to the elevation means, and is displaced vertically by the elevation means when this is actuated. Alternatively, the printing robot may be mounted to a rotatable base or platform carried by the elevation means.

In a particularly preferred embodiment of the invention, the method comprises the step of actuating the 3D printing device to deposit a number of climbing structure regions, wherein a climbing structure region is shaped to complement the dynamic engaging mechanism) of the elevation means, to obtain a tower structure incorporating a climbing structure that engages with the dynamic engaging mechanism of the elevation means.

The climbing structure engages with the elevation means, so that, as the tower "grows" upward, the 3D printing device can travel upwards by a corresponding distance when the elevation means is actuated.

The climbing structure can be formed on an inner and/or on an outer surface of the tower as this is being constructed using the additive manufacturing method according to embodiments of the invention. The manner in which the climbing structure is formed can depend on the type of elevation apparatus being used. Equally, the elevation apparatus can be built according to the type of climbing structure that can be formed.

In a preferred embodiment of the invention, the climbing structure is formed to extend beyond the tower body, preferably into the tower interior in the case of a hollow tower. For example, the climbing structure can comprise an essentially vertical rib or spur that radially extends into the tower interior. An inner vertical surface of such a rib or spur can be formed to engage with a corresponding part of the elevating means, as will be explained below. An advantage of this type of climbing structure is that the ribs or spurs are formed in one piece with the tower body, and can therefore make a significant contribution to the structural strength of the tower. This aspect can be exploited to increase the structural strength of a tower that has a certain wall or body thickness. Alternatively, the structural strength provided by such a climbing structure can permit a reduction in the wall or body thickness of the tower without compromising its strength, thereby keeping material costs favourably low.

A tall tower such as a wind turbine tower is generally conical in shape, being wider at the bottom than at the top, and a climbing structure realized as a vertical rib or spur can be formed such that its inner vertical surface is at an essentially constant distance from a central vertical axis of the tower. In such a realization, the amount by which a rib protrudes into the tower interior will decrease with increasing tower height.

In another preferred embodiment of the invention, the climbing structure is formed to extend at least partially into the tower body. The method according to embodiments of the invention can combine the two principles described above, so that for example the climbing structure extends outward from the tower body in a lower tower region, and is formed to extend at least partially into the tower body in an upper tower region.

In a preferred embodiment of the invention, by applying a sequence of layers with appropriately shaped climbing structure regions, a climbing structure is obtained that comprises at least one toothed rack to engage with a toothed wheel of the elevation means. In other words, the concrete layers are printed or deposited such that successive layers result in climbing structures, each with a series of recesses to match the protrusions of a toothed wheel. In a preferred embodiment of the invention, the elevation means comprises a plurality of vertically arranged toothed or ridged wheels, and a climbing structure comprises a corresponding number of vertical toothed or ridged racks. For example, the elevation means can comprise three vertical toothed wheels arranged equidistantly in an essentially horizontal plane, and the climbing structure can comprise a corresponding arrangement of three vertical toothed racks. The "teeth" of the racks are formed by printing appropriate layer shapes, i.e. by depositing the concrete to achieve the desired horizontal cross-section shape—negative or positive—at the current level. To raise or lower the platform, the toothed wheels are preferably synchronously turned, and the rotational motion of the toothed wheels is translated into a corresponding vertical displacement of the platform as the teeth of the wheels engage with the racks.

In a further preferred embodiment of the invention, the climbing structure is formed to comprise at least one helical screw thread to accommodate a climbing wheel of the elevation means. For example, the elevation means can have three or more climbing wheels, whereby a climbing wheel is arranged to describe a helical path of travel along the tower wall. The climbing structure can be formed to comprise three corresponding helical screw threads recessed into the tower body. The "threads" are formed by printing appropriate layer shapes, i.e. by depositing the concrete to achieve the desired horizontal cross-section shape at the current level. To raise or lower the platform, the climbing wheels are preferably synchronously turned, and the rotational motion of the wheels is translated into a corresponding vertical displacement of the platform. The climbing wheels can comprise an outer surface with a suitably high coefficient of friction, so that a climbing wheel does not slip against the concrete surface. Alternatively, this principle can be combined with the toothed wheel and rack principle described above, by forming a series of ridges in at least one of the helical threads to correspond with teeth or ridges on the outer surface of a climbing wheel.

In an alternative preferred embodiment of the invention, the dynamic engaging mechanism of the elevation means comprises an essentially horizontal stemming arrangement realized to apply opposing pressure on the interior tower surface to suspend the elevation means and the 3D printing device in the tower interior. The stemming arrangement can comprise several stemming "arms", e.g. hydraulic cylinders or robotic arms, which can be actuated to exert an outward lateral force against the tower interior walls. A stemming arm can comprise an essentially elongated or straight arm. Alternatively, a stemming arm can be articulated, i.e. comprising elongated sections connected by one or more joints. In one relatively straightforward realisation, three or more hydraulic cylinders can be deployed, equidistantly arranged in a star configuration and supporting the 3D printer in the centre of the star. A hydraulic pump and motor arrangement at the centre of the star configuration controls the pressure of the stemming arms individually and/or collectively. In a more sophisticated embodiment, the stemming arrangement comprises robotic stemming arms to hold the 3D printing apparatus in place and to displace it upwards or downwards. A pad at the outer end of each stemming arm can increase the contact area to the tower interior wall. Each stemming arm can have one or more degrees of freedom, e.g. an angular degree of freedom relative the centre of the elevation means. To effect a vertical displacement, the pressure applied by a stemming arm can be reduced to allow the pad to slide upwards along the tower interior wall (or downwards, if the elevation means is descending). One or more force/torque sensors can provide feedback to a controller, which adjusts the pressure accordingly. A force/torque sensor can be arranged at any suitable position, for example between pad and arm, between arm and tower surface, at a joint of an articulated stemming arm, etc. Alternatively or in addition, contact with the tower surface S can be improved by using suction pads to create a vacuum between the pad and the tower wall while the stemming arm is stationary. Equally, a high-friction material can be applied to the outer surface of the pad.

In another preferred embodiment of the invention, the elevation means comprises a stemming arrangement realized to apply opposing pressure on the exterior tower surface to suspend the elevation means and the 3D printing device in the tower interior.

The principles described above can be combined in a hybrid approach. For example, the elevation means can be equipped with one hydraulic arm carrying a toothed wheel, and two or more hydraulic stemming arms (or vice versa). The 3D printer can be controlled to print one vertical toothed rack with which the wheel can engage. The stemming arms can be actuated to shift upwards (or downwards) following the vertical travel of the wheel along the toothed rack.

In another realisation, the dynamic engaging mechanism of the elevation means can be realized as a type of clamp that "straddles" the tower wall, with one or more pairs of hydraulic and/or robotic clamping arms, for example articulated arms, as described above. The clamping arms can be arranged in a pair-wise fashion. Each arm can terminate in a pad which can lie against the tower wall surface. In this way, a clamping arm pair can apply opposing pressure on the outside and inside wall surfaces. For example, the clamping arms can be controlled to force the pads against the tower wall so that they engage with the tower surface. The 3D printing device can be mounted atop the clamp, so that it is essentially suspended over the tower wall. With an arrangement of three clamping arm pairs (resembling an insect), two pairs can apply opposing pressure at any one time while a third pair advances some distance along the circumference of the tower. By alternately clamping and moving, the entire apparatus can move around the tower circumference while the 3D printer applies a layer of fluid concrete. Alternatively, the 3D printing device can have an articulated arm realized to extend over the largest diameter of the tower, so that it can print an annular ring while the clamping arrangement remains stationary. Subsequently, the elevation controller can actuate the hydraulic arms of the clamp to effect a vertical displacement of the elevation means and the 3D printing device as the tower grows. The clamp arms can be controlled to adjust the forces applied to the inner and outer tower wall surfaces according to the position of the 3D printer and any torque it exerts on the elevation means.

In the method according to embodiments of the invention, a continual supply of concrete is preferably supplied to the 3D concrete printing device. To this end, a concrete mixing and pumping apparatus can be used to continually prepare a suitable concrete mix and to pump this under pressure to the level of the 3D concrete printing device. A suitably flexible and/or extendable hose can be used to convey the fluid concrete. Preferably, the composition of the concrete is adjusted by a suitable controller according to the desired slump value of the concrete and/or thickness of the concrete layer to be printed and/or to the desired hardening time of the concrete layer and/or to the current height of the 3D concrete printing device or platform above the mixing and pumping apparatus. Such a controller preferably also adjusts the pump pressure to compensate for the height of the fluid concrete column between the pump and the platform. With these measures, a consistent quality of concrete composition can be ensured at all levels of the tower during the additive manufacturing process.

The elevation apparatus preferably comprises a drive unit for turning the wheels to raise the platform. To actuate the elevation means, the drive unit can be controlled by an appropriate controller that causes the drive unit to raise or lower the platform at a desired rate. For example, while the tower or tower section is being constructed, the elevation apparatus can be raised at a controlled rate that can be determined by the hardening rate of the concrete already deposited, by the tower circumference at that level, and by the number of printing heads in use. In this way, by controlling the 3D printing head(s) and the elevation apparatus in a synchronous manner, it is possible to continually print concrete onto the currently uppermost surface so that the tower structure "grows" without interruption. The favourably rapid tower construction can significantly reduce the overall costs of a wind turbine.

In a preferred embodiment of the invention, any controllers used to control the various components are synchronized. For example, the print controller (used to control the 3D concrete printing apparatus), drive unit (used to raise or lower the platform), and the mixing apparatus controller (used to control the concrete mixing and pumping apparatus) can operate in a synchronized manner. For example, the mixing apparatus controller can adjust the concrete composition and the pumping pressure in order to ensure that the concrete mixture has the correct consistency by the time it is ejected from the feed head(s), while the print controller can deposit concrete at a rate according to the surface area of the layer being printed, which in turn depends on the height of the tower at that level. Similarly, the drive unit can control the rate at which the elevation platform is raised, so that the platform is raised more slowly at the lower levels (since the layers are larger) and more rapidly at the upper levels (which can be deposited more quickly on account of their relatively small area). The controllers can be realized separately, or can be combined in a system controller, for example. A suitable computer program product can be loaded into the memory of such a system controller to generate a sequence of instructions for actuating the 3D concrete printing device to deposit concrete layers, to actuate the drive unit of the elevation means, and to control the mixing and pumping apparatus.

A concrete structure generally requires some kind of strengthening elements to enable it to withstand loading forces. Therefore, in a preferred embodiment of the invention, the concrete layers are deposited to form a number of vertical channels in the tower body to accommodate post-tensioning cables or tendons. Alternatively or in addition, reinforcing elements such as rebar can be embedded in the concrete while the tower is being printed. At the same time, lightning conductors can be embedded in the body of the tower, as will be known to the skilled person.

Since additive manufacturing techniques are highly flexible, other aspects can be considered during the 3D tower printing method according to embodiments of the invention. For example, a lower region of the tower can be formed during the construction process to leave an opening that can later be used as a doorway to access the tower interior, or to leave an opening through which power cables exit the tower. A known issue relating to high towers such as wind turbine towers, particularly offshore towers, is the problem of tower loading during high wind conditions. The method according to embodiments of the invention would allow an arrangement of narrow vertical slits to be formed in the tower body at various levels, so that wind can pass through the tower, thereby reducing the loading forces. The method according to embodiments of the invention could be also used to print a "honeycomb" structure, essentially open to the wind, into regions of the tower.

The method according to embodiments of the invention can be used to 3D print an entire concrete tower, from foundation level to an uppermost level. For example, a concrete wind turbine tower can be 3D printed from its foundation to an uppermost level at which the yaw apparatus is mounted. The method according to embodiments of the invention is particularly suited to the construction of offshore towers, since the 3D printing method does not need any large crane apparatus, and can significantly reduce the overall construction costs. Alternatively, concrete tower sections can be 3D printed and then stacked to construct a complete tower.

The elevation means can be removed once the tower has been completed. Alternatively, the elevation means and drive unit can remain in the tower, and can be used to support a height-adjustable service platform, for example to allow service technicians to access a yaw drive unit at an upper level of a wind turbine tower.

The method and apparatus according to embodiments of the invention are not restricted to the construction of towers, but can be used to build a variety of structures. For example, a straight wall section of a building could be constructed using the method according to embodiments of the invention.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
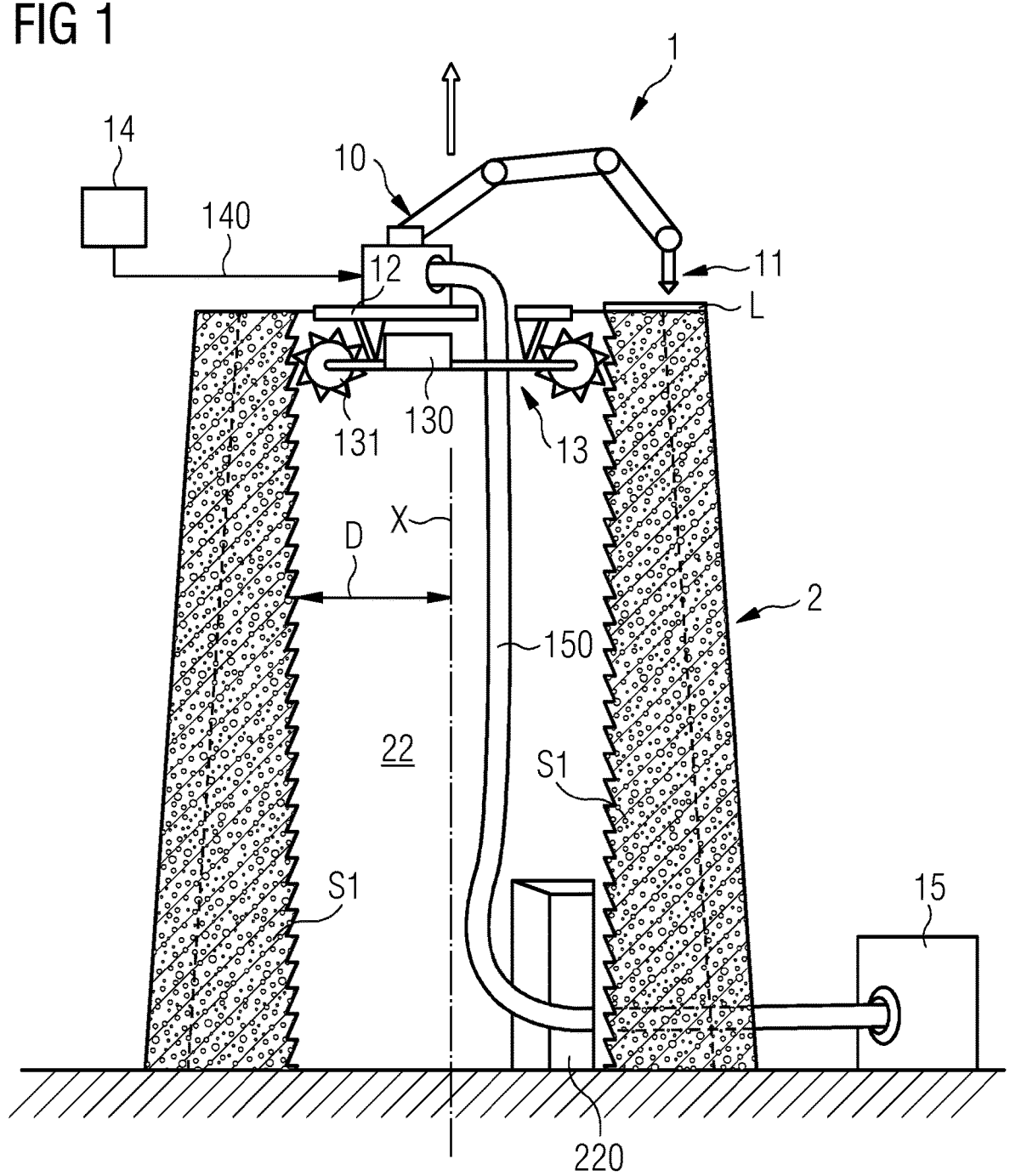
FIG. 1 shows a tower construction stage using a first embodiment of the tower printing apparatus according to embodiments of the invention.

FIG. 1 shows a tower construction stage using a first embodiment of the 3D tower printing apparatus 1 according to embodiments of the invention. The diagram shows a partially completed tower structure 2. The 3D printing apparatus 1 comprises an industrial robot 10 realized to dispense fluid concrete from a feed head 11 in an additive manufacturing process in which successive concrete layers L are "printed" to obtain a tower structure 2. This 3D concrete printer is arranged on a platform 12, which is mounted to an elevation means 13. A mixing and pumping arrangement 15 mixes concrete and pumps the fluid concrete to the 3D concrete printer 10. Of course, the fluid concrete could be fed directly to the feed head 11. A print controller 14 (shown as an abstract box in the diagram) issues print commands 140 to control the quantity of concrete to be dispensed, the rate of dispensing, the movement of the feed head, etc. The print controller 14 can be part of an overall system controller (not shown in the diagram). The print commands 140 can be transmitted wirelessly to the robot 10, or by means of a wired communications interface.

In this exemplary embodiment, the robot 10 is controlled to deposit unbounded concrete layers L successively to "grow" the tower body as well as a climbing structure S1. The tower body has a hollow conical shape (indicated by the broken lines), and in this embodiment the climbing structure S1 is realized as a number of ribs or spurs that extend into the interior 22 of the tower structure 2, with a ridged outer surface to engage with ridged or toothed wheels 131 of the elevation means 13. Here, the ridged outer surface of each climbing structure S1 maintains an essentially constant distance D to the central axis X of the tower 2, and the spurs S1 or ribs S1 therefore extend furthest into the tower interior 22 at a lower tower region. At an uppermost tower level, the ridged outer surface of each climbing structure S1 can become flush with the tower wall. For the sake of simplicity, the diagram only shows two diametrically opposing climbing structures S1. A practicable arrangement might comprise three such climbing structures S1 arranged equidistantly at 120° intervals, for example, or four climbing structures S1 arranged equidistantly at 90° intervals.

The robot 10 is controlled to deposit concrete in a tower body region and climbing structure regions to arrive at the one-piece structure 2 shown in the diagrams. Initially, while a lower level is being formed, the elevation means may not be required. After the tower has "grown" to a certain height, the elevation means 13 can be arranged to engage with the climbing structures S1, and a drive unit 130 of the elevation means 13 can be controlled to actuate toothed wheels 131, thereby raising the platform 12 upwards as indicated by the arrow. The drive unit 130 can comprise a motor, for example an electric motor driven by battery or connected to a generator (not shown). A system controller can control the print robot 10, a mixing apparatus 15, and the drive unit 130 in a synchronous manner, so that concrete with the correct consistency is continually supplied by a feed line 150 to the robot 10, which moves the feed head 11 to follow a predefined pattern to deposit a helical layer of concrete while the platform is being slowly raised upward by the elevation means 13. In this way, the tower structure 2 can "grow" in an essentially uninterrupted manner. While the diagram only shows a robot 10 with one articulated arm for one feed head, it should be understood that the apparatus 1 can comprise a plurality of such articulated arms, allowing multiple feed heads to apply layers of concrete in a synchronized manner.

The inventive additive manufacturing technique is quick and uncomplicated, allowing a very high tower to be "printed" within a relatively short time, and does not need any mould or slip-form to contain or shape the wet concrete as it is being deposited. The approach taken by embodiments of the invention allows layers of concrete with a precisely controlled consistency (regarding wetness, viscosity, slump value, setting time etc.) to be deposited or printed without any need to contain or mould the concrete while it hardens. Applying successive unbounded or uncontained layers of concrete in this way may result in a ridged texture on the walls of the tower. If a smooth wall is desired, for example a smooth outer tower wall, an additional tool may be deployed to smooth the outer surface of a printed layer, for example a flat blade may be drawn along the outer surface of the soft concrete to smoothen it. Such a tool can be guided by an additional robot arm to follow the printer head, for example.

This exemplary embodiment shows the mixing apparatus 15 connected by the feed line 150 to the print robot 10, and the feed line 150 passes through an opening 220 in the lower tower region. This opening 220 can serve as a doorway later on, or to provide a passage for power lines to a subsea cable arrangement. Although not shown in the diagram, the feed line 150 can be extended to reach to an uppermost level of the tower structure 2 when the apparatus 1 is used to construct an entire tower in one piece.

Figure 2:
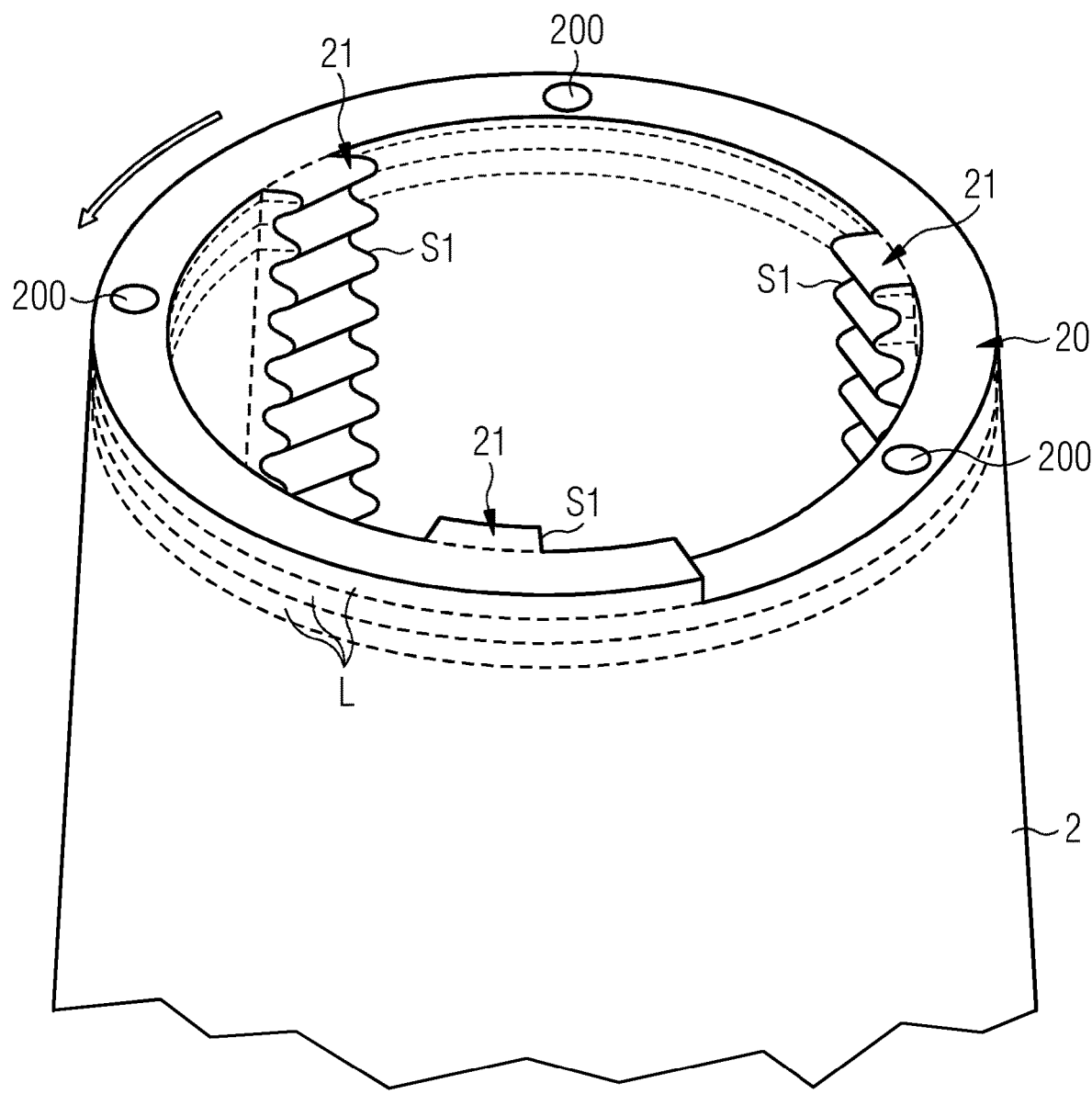
FIG. 2 shows a perspective view of a partially constructed first embodiment of a concrete tower according to embodiments of the invention.

FIG. 2 shows a simplified perspective view of a partially constructed first embodiment of a concrete tower structure 2. This diagram shows an arrangement of three equidistantly arranged ribs S1 with ridged outer surfaces for engaging with toothed or ridged wheels of an elevation means (not shown). When the wheels of the elevation means are turned, a platform mounted to the elevation means will be moved vertically. The diagram indicates a series of layers L. The uppermost layer L has been deposited by guiding the feed head of the 3D concrete printing robot, following an essentially circular path, to deposit concrete in a tower body region 20 and in climbing structure regions 21. To print a slight "overhang" in a climbing structure region 21, the feed head can be controlled to release the concrete more slowly, so that the concrete can effectively harden as it is being deposited. The feed head of the 3D concrete printing robot can also be guided to not deposit concrete in cavity regions 200, i.e. to circumvent such cavity regions 200. At each layer level, a cavity region 200 is "omitted" by the print head, so that the finished tower structure will have a number of vertical channels for post-tensioning cables or tendons.

Figure 3:
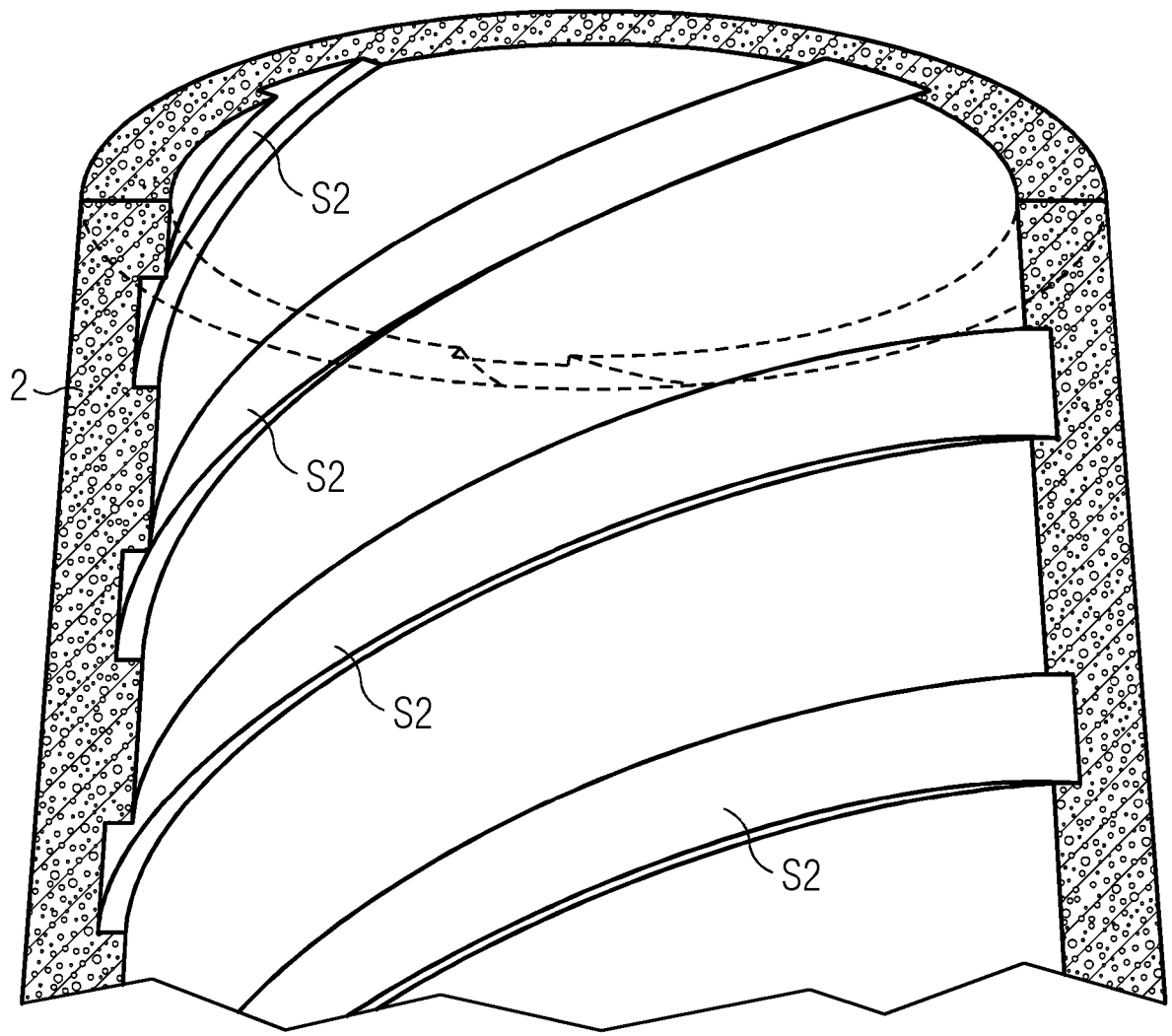
FIG. 3 shows a cutaway view of a partially constructed second embodiment of a concrete tower according to embodiments of the invention.

FIG. 3 shows a cutaway view of a partially constructed second embodiment of a concrete tower structure 2. In this embodiment, the climbing structure S2 comprises three helical "screw threads" S2 recessed into the tower wall at a relatively flat pitch. An elevation means with three inclined climbing wheels can engage with the helical recesses, and when the wheels are turned, a platform mounted to the elevation means will be moved vertically. Here also, vertical cavities for post-tensioning cables can be formed in the tower body during the 3D concrete printing process. Equally, in any of these embodiments, other strengthening elements such as rebar can be embedded in the tower body. The robot 10 may have an articulated arm dedicated to handling rebar elements in addition to its articulated arm(s) for the feed head(s).

Figure 4:
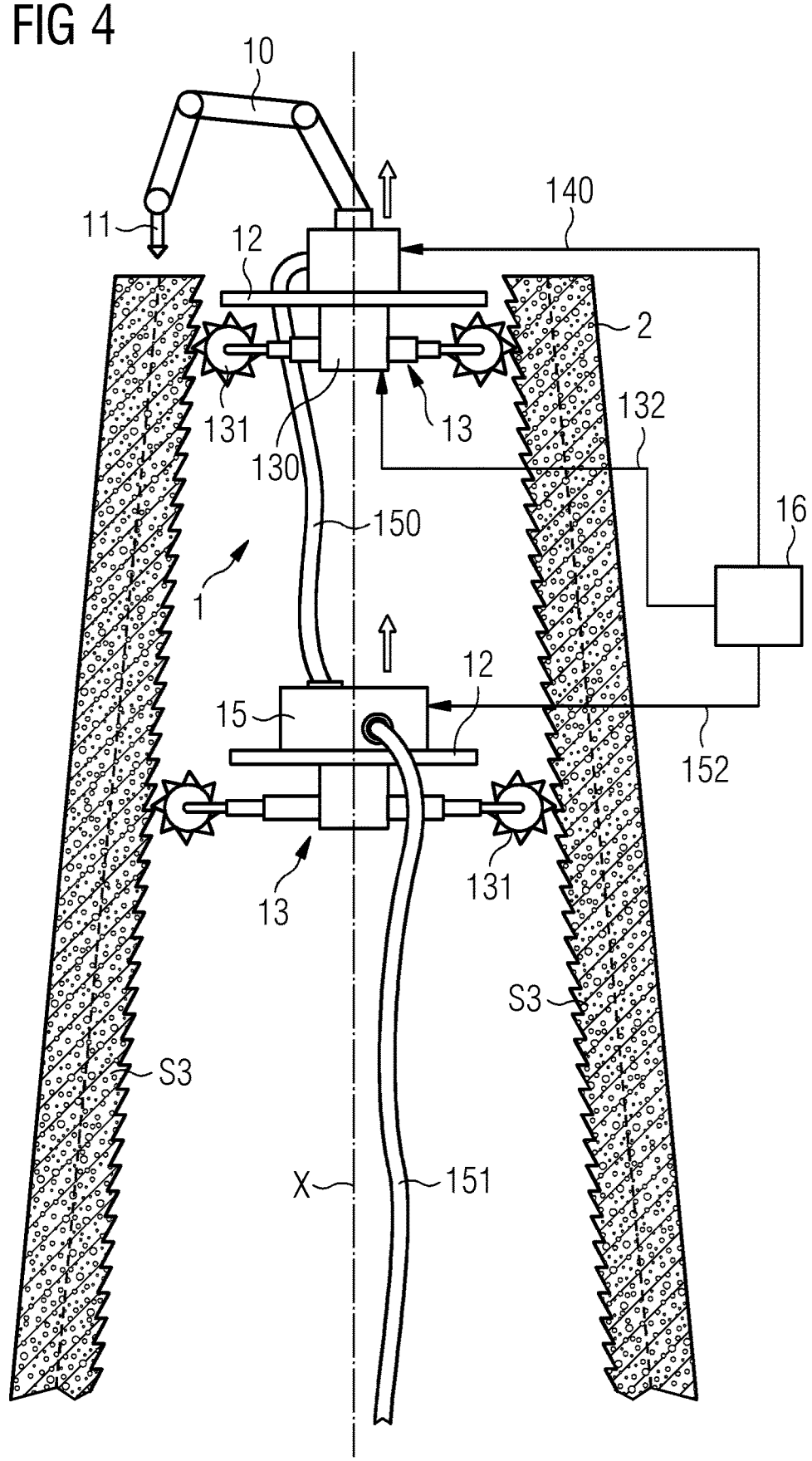
FIG. 4 shows a tower construction stage using a second embodiment of the tower printing apparatus according to embodiments of the invention.

FIG. 4 shows a tower construction stage using a second embodiment of the 3D tower printing apparatus 1 according to embodiments of the invention. Here, as already shown in FIG. 1, a robot 10 is arranged on a platform 12 which can be raised by an elevation means 13. In this embodiment, the climbing structure S3 has been formed to follow the tower wall, i.e. the distance from the tower axis X to a ridged surface of the climbing structure S3 decreases with increasing tower height. The elevation means 13 comprises an adjustable arrangement, for example a hydraulic drive unit and a set of hydraulic pistons for extending the ridged wheels 131 in the direction of the tower wall. As the tower grows, the hydraulic pistons can be retracted while the ridged wheels 131 are being turned to raise the platform. When the tower is completed, the platform can descend by turning the wheels in the opposite direction and extending the hydraulic pistons so that the ridged wheels always engage with the climbing structure.

This embodiment also shows a second platform 13 with the same type of elevation means 13. This second platform is used to carry a mixing apparatus 15. An advantage of this arrangement is that the feed line 150 need not be overly long, even if a very high tower is being constructed. The relatively short feed line 150 can ensure that the concrete is still sufficiently fluid by the time it reaches the feed head 11 for printing. A system controller 16 issues print commands 140, mix commands 150, and drive commands 132 to control the elements 10, 11, 13, 15 of the 3D tower printing apparatus 1 in a controlled and synchronous manner.

Figure 5:
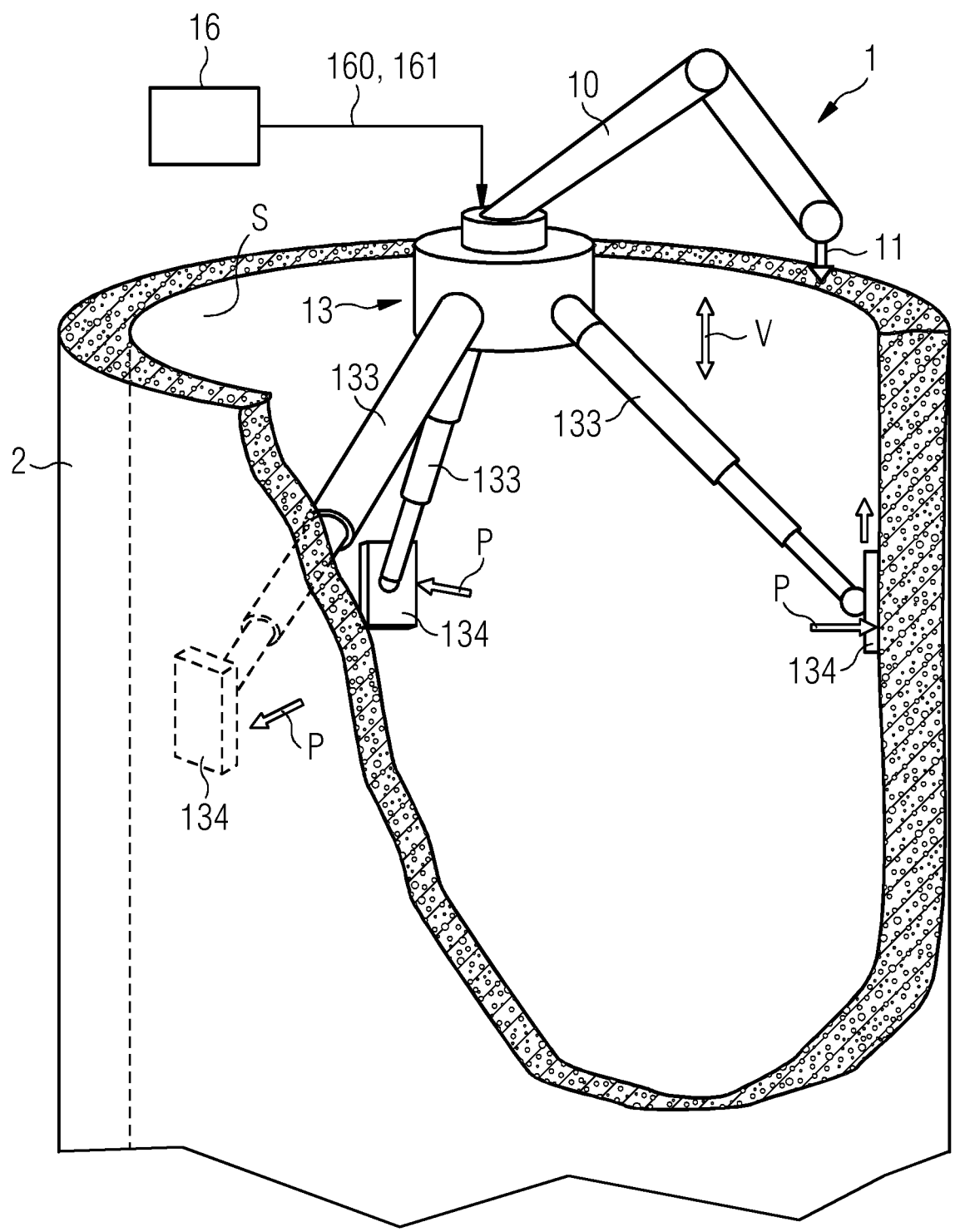
FIG. 5 shows a tower construction stage using a second embodiment of the tower printing apparatus according to embodiments of the invention.

FIG. 5 shows a tower construction stage using a second embodiment of the 3D tower printing apparatus 1 according to embodiments of the invention. The diagram shows a partially completed tower structure 2. As described in the previous diagrams, the 3D printing apparatus 1 comprises an industrial robot 10 realized to dispense fluid concrete from a feed head 11. In this embodiment, the 3D concrete printer is mounted to an elevation means which uses a star-shaped arrangement of hydraulic pistons 133 or stemming arms 133 to suspend the 3D concrete printer 10 in the tower interior using the principle of opposite pressure. A pad or foot 134 is mounted at the end of each hydraulic stemming arm 133. The arms 133 originate from a hub at the centre of the star configuration. The hub can accommodate any pumps, motors etc. for regulating the pressure in each stemming arm 133. Each arm 133 has a certain angular degree of freedom relative to the hub so that a pad 134 can be moved upward to a new position on the tower wall. In this embodiment, three equidistant stemming arms 133 are controlled to apply opposing pressure P via three pads 134. The pressure is applied to hold the printer 10 at a desired level as the print head 11 deposits a layer of fluid concrete. A system controller 16 can issue printer control commands 160 and elevation control commands 161 to synchronize the movements of the elevation means 13 to the printing procedure.

An alternative embodiment (not shown) could comprise two star configurations of three or more stemming arms, originating from the same hub, arranged so that one set of stemming arms continually applies opposing pressure to suspend the printing device in place, while the other set is displaced upwards. The process is repeated, with each set of pistons alternately fixing the position of the 3D printer and then moving upward. A similar control sequence allows the printer to be lowered back down to the ground when the tower is complete.

In another realisation, 3D tower printing apparatus 1 can comprise a clamp to "straddle" the tower wall 2, for example with an arrangement of three clamping arm pairs to apply opposing pressure on the outside and inside wall surfaces. The 3D printing device 10 can be mounted atop the clamp, essentially suspended over the tower wall 2. Two clamping arm pairs can apply opposing pressure at any one time while a third pair advances some distance along the circumference of the tower. Alternatively, the 3D printing device 10 can have an articulated arm realized to extend over the largest diameter of the tower 2, so that it can print an annular ring while the clamping arrangement remains stationary.

Similarly to FIG. 1, a mixing and pumping arrangement (not shown) mixes concrete and pumps the fluid concrete to the 3D concrete printer 10, and a print controller (not shown) issues print commands 140 to control the quantity of concrete to be dispensed, the rate of dispensing, the movement of the feed head, etc. The control methods explained in FIG. 1 can apply here also, e.g. a system controller can control the print robot 10, a mixing apparatus and the drive unit 130, so that concrete with the correct consistency is continually supplied by a feed line to the robot 10, which moves the feed head 11 to follow a predefined pattern to deposit a helical layer of concrete, and to actuate the stemming arms to gradually elevate the printer 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of constructing a concrete tower, the method comprising:

A: providing an elevation means comprising a dynamic engaging mechanism configured to engage with a tower surface;

B: arranging a 3D printing device on the elevation means, the 3D printing device including a robot configured to dispense a fluid concrete from a feed head, the fluid concrete being pumped to the 3D printing device, the robot being an industrial concrete printing robot having a swivel base mounted on a platform of the elevation means and an articulated robot arm that moves radially with respect to the swivel base of the robot to reach a circumference of the concrete tower;

C: actuating the dynamic engaging mechanism to effect a vertical elevation of the elevation means upwardly through a central opening within the concrete tower such that the dynamic engaging mechanism is surrounded by the tower surface that faces towards a central axis of the concrete tower;

D: actuating the 3D printing device to deposit an essentially horizontal material layer of the fluid concrete along the circumference of the concrete tower to form at least a tower body region without using a slipform;

E: adjusting the dynamic engaging mechanism in a radial direction to accommodate for changes in a diameter of the central opening of the concrete tower; and F: repeating steps C-E to obtain a tower structure.

2. The method according to claim 1, comprising the step of actuating the 3D printing device to deposit a number of climbing structure regions, wherein a climbing structure region of the number of climbing structure regions is shaped to complement the dynamic engaging mechanism of the elevation means, to obtain a tower structure incorporating a climbing structure that engages with the dynamic engaging mechanism of the elevation means.

3. The method according to claim 1, wherein a climbing structure is formed to extend at least partially into a body of the tower structure and/or to extend at least partially beyond the body of the tower structure and/or to extend into a tower interior.

4. The method according to claim 1, wherein the dynamic engaging mechanism of the elevation means comprises a number of toothed wheels, and wherein a climbing structure is formed to comprise at least one toothed rack to engage with a toothed wheel of the number of toothed wheels.

5. The method according to claim 1, wherein the elevation means comprises a plurality of vertically arranged toothed wheels, and a climbing structure comprises a corresponding number of vertical toothed racks.

6. The method according to claim 1, wherein a climbing structure comprises a plurality of helical screw threads to accommodate a corresponding number of climbing wheels of the elevation means.

7. The method according to claim 1, comprising the step of actuating the elevation means to raise the platform at a rate corresponding to a hardening time of a previously applied material layer.

8. The method according to claim 1, wherein adjusting the dynamic engaging mechanism in the radial direction includes hydraulically extending a portion of the dynamic engaging mechanism towards the tower surface as the diameter of the central opening increases.

9. The method according to claim 1, wherein adjusting the dynamic engaging mechanism in the radial direction includes hydraulically retracting a portion of the dynamic engaging mechanism as the diameter of the central opening decreases.

10. A 3D tower printing apparatus comprising:
an elevation means comprising a dynamic engaging mechanism configured to engage with a tower surface;
an elevation controller for actuating the dynamic engaging mechanism to effect a vertical elevation of the elevation means upwardly through a central opening within the concrete tower such that the dynamic engaging mechanism is surrounded by the tower surface that faces towards a central axis of the concrete tower;
a 3D printing device arranged on the elevation means, the 3D printing device including a robot configured to dispense a fluid concrete from a feed head, the fluid concrete being pumped to the 3D printing device, the robot being an industrial concrete printing robot having a swivel base mounted on a platform of the elevation means and an articulated robot arm that moves radially with respect to the swivel base of the robot to reach a circumference of the concrete tower;
a print controller for actuating the 3D printing device to deposit material in a series of essentially horizontal layers without using a slipform, each layer comprising at least a tower body region to obtain a tower structure; and
an adjustment arrangement for adjusting the dynamic engaging mechanism in a radial direction to accommodate for changes in a diameter of the central opening of the concrete tower.

11. The apparatus according to claim 10, wherein the dynamic engaging mechanism of the elevation means comprises a plurality of wheels, and wherein the print controller is configured to control the 3D printing device to print a plurality of climbing structure regions, wherein the plurality of climbing structure regions are shaped to complement a wheel.

12. The apparatus according to claim 10, wherein the dynamic engaging mechanism of the elevation means comprises a stemming arrangement configured to apply opposing pressure on an interior tower surface.

13. The apparatus according to claim 12, wherein the stemming arrangement comprises at least one star configuration of stemming arms.

14. The apparatus according to claim 10, wherein the elevation means comprises a hydraulic drive system.

15. The apparatus according to claim 10, wherein the feed head is configured to dispense the fluid concrete in response to a print instruction from the print controller.

16. The apparatus according to claim 10, comprising a mixing and pumping apparatus to mix the fluid concrete and to pump the fluid concrete to the 3D printing device, and a controller configured to adjust a fluid concrete composition and a pumping pressure according to a height above ground of the 3D printing device.

* * * * *